United States Patent
Bajko et al.

(10) Patent No.: US 8,644,851 B2
(45) Date of Patent: Feb. 4, 2014

(54) CHANNEL AVAILABILITY FOR WHITE-SPACE DEVICES, ASSOCIATED APPARATUS AND METHODS

(75) Inventors: Gabor Bajko, Sunnyvale, CA (US);
Jussi Tapani Kahtava, Fleet (GB);
Kodo Shu, Beijing (CN)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/503,019

(22) PCT Filed: Oct. 20, 2009

(86) PCT No.: PCT/EP2009/007510
§ 371 (c)(1),
(2), (4) Date: Apr. 19, 2012

(87) PCT Pub. No.: WO2011/047694
PCT Pub. Date: Apr. 28, 2011

(65) Prior Publication Data
US 2012/0208558 A1 Aug. 16, 2012

(51) Int. Cl.
*H04W 24/00* (2009.01)
(52) U.S. Cl.
USPC .................................. 455/456.1; 455/63.1
(58) Field of Classification Search
USPC ........... 455/456.1, 63.1, 422.1; 370/329, 338, 370/315
See application file for complete search history.

(56) References Cited

U.S. PATENT DOCUMENTS

| | | | | |
|---|---|---|---|---|
| 2006/0068822 A1* | 3/2006 | Kalhan | ......................... | 455/517 |
| 2007/0253394 A1* | 11/2007 | Horiguchi et al. | ............ | 370/338 |
| 2009/0061779 A1* | 3/2009 | Gurney et al. | ............... | 455/63.1 |
| 2009/0168689 A1* | 7/2009 | Itagaki et al. | .................. | 370/315 |
| 2010/0046440 A1* | 2/2010 | Singh | ............................ | 370/329 |
| 2010/0284388 A1* | 11/2010 | Fantini et al. | ................. | 370/338 |

FOREIGN PATENT DOCUMENTS

WO WO2010021780 2/2010

OTHER PUBLICATIONS

International Search Report of International Application No. PCT/EP2009/007510—Date of Completion of Search: Sep. 16, 2010—7 pages.
International Written Opinion of the International Searching Authority of International Application No. PCT/EP2009/007510—Date of Completion of Opinion: Sep. 16, 2010—23 pages.
Celebi, H. et al, "Utilization of Location Information in Cognitive Wireless Networks", IEEE Wireless Communications, Aug. 2007, pp. 6-13.
Gurney, D. et al., "Geo-location Database Techniques for Incumbent Protection in the TV White Space", IEEE, 978-1-4244-2017, Sep. 2008, pp. 1-9.

(Continued)

*Primary Examiner* — Jinsong Hu
*Assistant Examiner* — Nathan Taylor
(74) *Attorney, Agent, or Firm* — Locke Lord LLP

(57) ABSTRACT

An apparatus configured to determine one or more channels available for use by respective one or more white-space devices in a particular determined geographical location. The apparatus is configured to: receive geographic location signalling associated with the particular determined geographical location of one or more white-space devices; receive uncertainty indication signalling for the uncertainty associated with the particular determined geographic location of the one or more white-space devices; and determine the one or more channels available for use by the respective one or more white-space devices in the particular determined geographical location by using the geographic location signalling and uncertainty indication signalling.

7 Claims, 5 Drawing Sheets

(56) References Cited

OTHER PUBLICATIONS

Stevenson, C. et al., "IEEE 802.22: The First Cognitive Radio Wireless Regional Area Network Standard", IEEE Communications Magazine, Jan. 2009, pp. 130-138.

* cited by examiner

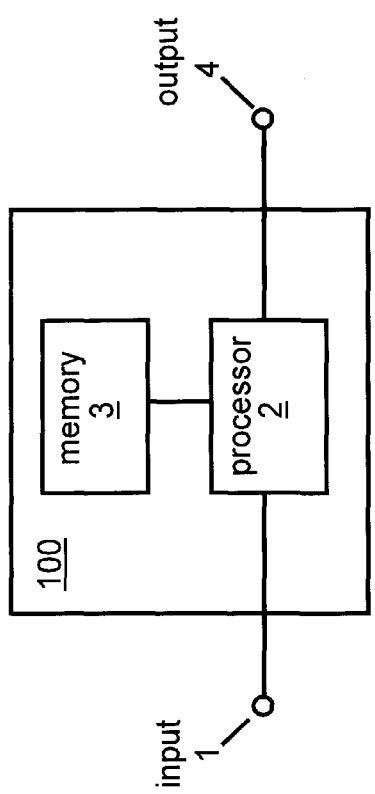
FIG. 2
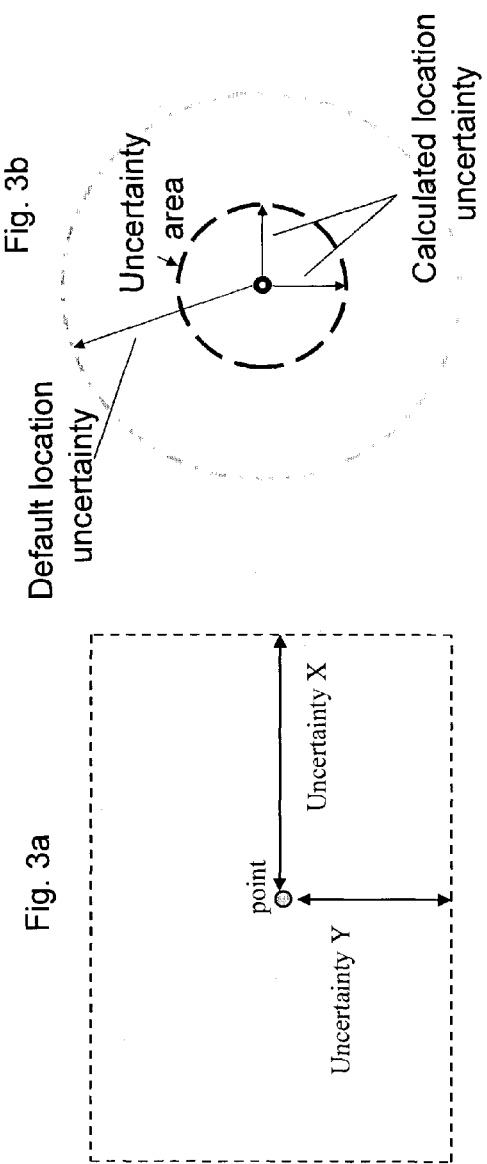
Fig. 3a
Fig. 3b

CHANNEL AVAILABILITY FOR WHITE-SPACE DEVICES, ASSOCIATED APPARATUS AND METHODS

TECHNICAL FIELD

The present disclosure relates to the field of white-space devices (also known as WSDs), associated methods, computer programs and apparatus. Certain disclosed aspects/embodiments may relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus discussed in relation to, or according to one or more disclosed aspects/embodiments may provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

For the purposes of wireless telecommunication, national and international bodies assign frequency bands (or channels) within the radio spectrum for specific uses, and in most cases, license the rights to these channels. Some specific parts of the spectrum may not be used by licensed services in a specific location at a specific time. Local regulatory authorities typically control and authorise the use of white-space in their own respective regions, and the available "white-space" bandwidth will therefore vary from country to country.

On the 4 Nov. 2008, the Federal Communications Commission (FCC) approved the use of vacant/unused portions of the broadcast spectrum in the 54 MHz-698 MHz range by unlicensed devices for fixed and personal/portable use. These vacant/unused portions of the spectrum are known as "white spaces". These became available for "unlicensed secondary use" after the switchover to digital TV broadcast. The FCC has also defined numerous safeguards in order to protect services and service providers against harmful interference of white spaces devices.

Firstly, all unlicensed white-space devices must include geographical location technology that allows the device to determine its location and to match the current location of the device against a pre-existing database of available channels corresponding to that geographical area.

FIG. 1 illustrates a channel availability database as presently known in the art. In essence, such databases cross reference geographical areas with white-space channels available for use within specific sub-regions of that geographical area. For example, a geographical area (such as a country, country state, etc) may be dissected or sub-divided into a plurality of sub-regions within the database. Each of these sub-regions may have a specific set of white-space channels that may be usable within that sub-region. This is illustrated in FIG. 1, whereby each sub-region (denoted by the boxed areas in the database grid) contains an indication whether channel/band 'A' and/or 'B' is available for use within each particular sub-region. Geographical areas and channels recorded by these databases are, at least in some current channel availability databases (such as those in the US), divided up so as to be denoted by rectangular (e.g. 50 m-by-50 m or 100 m-by-100 m) geographical sub-regions or grid points (as in this example the channel availability database is in the form of a grid, with each geographical sub-region being a regular shaped grid point or box). In the US at least, this is to be in conformity with current FCC rulings, but other regions may have different standards and implement their availability database(s) differently.

These databases operate on the principle that, if the geographic location of a particular white-space device is known, then the channels available for use by that white-space device can be identified by comparing the geographical location of the white-space device to the geographical area represented by the database. Where the geographic location of the white-space device matches up/overlaps with one or more geographical sub-regions, the channels available for use by that white-space device being in the particular determined geographical location are thereby determined.

Secondly, according to the FCC ruling, all unlicensed white-space devices must access such a channel availability database to determine channels that they are allowed to operate on before they begin white-space transmission or operation. WSDs must therefore transmit and inform their determined geographic location when querying with such databases.

For example, some white-space devices may determine their location via an onboard GPS system, or they may utilise local Wi-Fi networks to establish their position. Others may actually be geographically fixed and therefore they know their exact location anyway. Typically, the geographic location of the white-space device is encoded using Geography Markup Language (GML) which is a standard used to universally encode and transmit geographical location of such devices. There are many methods known in the art for determining the geographical location of such devices and, as such, will not be discussed at length here.

When a white-space device sends its location to the database via query signalling, the database can verify which channels are available for use within the area the white-space device has identified it is located in. The database should only inform the white-space device of channels that can be used without interference with other devices, primary users of such devices and protected entities (for example, entities/devices operating on frequencies/bandwidths that are already allocated to a particular use). This may sometimes entail informing a white-space device that no channels are available where necessary.

The FCC also requires new unlicensed white-space devices to include spectrum-sensing technology allowing them to detect the presence of other signals in their vicinity. For example, to detect if there are other localised wireless transmission/reception sources in their vicinity that the white-space devices could interfere with if they operated on these frequencies. Such information is constantly in flux and unpredictable, and therefore is not typically logged in a channel availability database. Therefore the white-space devices must conduct their own localised survey of their location/area to verify white-space channels suitable for them to operate over.

On start-up, white-space devices will query the database with their current location (likely gleaned from GPS or mobile telephone triangulation) and will receive in response a list of frequencies that can (and/or cannot) be used within their local area. The available channel availability data provided from the database may then be stored on the memory of the device.

It is well known that there is frequently an element of inaccuracy when measuring geographic location. To compensate for this in the prior art, when the database receives a geographic location of a white-space device, it automatically assumes a default inaccuracy/uncertainty to this geographic location. At present, to be in conformity with present FCC standards/rulings, a default uncertainty of ±50 m is to be assumed for each reported geographic location. This uncertainty in the location of the white-space device is shown in FIG. 1. This effectively translates as meaning that the white-space device may actually be located anywhere within the default uncertainty area (denoted by the annotated circle). This means that, when the database is identifying which channels are available for use, the database must consider all of the geographic sub-regions that the white-space device could be located in. As such, the only channels that can be identified as available are those that are common to all these possible geographic sub-regions that the white-space device could be located in.

This is a problem in many situations. For example, if the device is actually physically located in a geographic sub-region that has channels A & B available to the device, but the default uncertainty overlaps with another sub-region that only has A available, then the database can only identify channel A as available and suitable for use by the white-space device. This can result in an inefficient use of the available channels and can place unnecessary restrictions on such white-space devices (for example, on bandwidth).

This problem is further compounded in situations such as in FIG. 1, where it can be seen that there is no common channel across all sub-regions that the white-space device could be located in (based on the default uncertainty assumption). In such a scenario, the white-space device would be incapable of operating, despite being actually physically located in a region that allows for operation in bands A & B, resulting in an inefficient use of the available channels/spectrum.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first aspect, there is provided an apparatus configured to:
  receive geographic location signalling associated with the particular determined geographical location of one or more white-space devices;
  receive uncertainty indication signalling for the uncertainty associated with the particular determined geographic location of the one or more white-space devices; and
  determine the one or more channels available for use by the respective one or more white-space devices in the particular determined geographical location by using the geographic location signalling and uncertainty indication signalling.

This allows the apparatus to determine, for a given white-space device, the channels available for use by that device. For example, the white-space device may be a portable electronic device such as a mobile phone or PDA that is intended to wirelessly stream information/data/content using a suitable white-space channel. The apparatus of the first aspect can use the location and uncertainty indication signalling to identify which channels that particular white-space device can use. The apparatus of the first aspect can provide this information to the white-space device to inform the device that it can operate on one or more channels determined as available for use.

The apparatus may comprise an input. The input may be a wireless receiver or may be physically hardwired to a further wireless receiver that allows the respective signalling types to be received by the apparatus.

The apparatus may also comprise an output. The output may be a wireless transmitter or may be physically hardwired to a further wireless transmitter to allow the apparatus to provide/transmit the identified channels available for use to particular white-space devices.

The signalling received by the apparatus may be part of a channel availability query originating from one or more white-space devices. The query may be received directly from a querying white-space device, or it may be received indirectly via other intermediary stages (such as further devices, white-space or otherwise, wired or wireless, or the like).

The apparatus is configured to perform the abovementioned steps. The apparatus may comprise one or more electronic components such as processors, application specific integrated circuits (ASICs), or the like, that are configured to perform the determining step.

The uncertainty indication signalling may be indicative of an uncertainty area, the uncertainty area defining a geographical area, within which the respective white-space device may be located. This uncertainty area may be determined according to the errors associated with the way in which the particular geographical location of the one or more white-space devices is determined. The uncertainty area may also be represented in the form of a polygon. The area of the polygon may be defined by its edges and or its corners, and the white-space device may be located anywhere within that polygon uncertainty area.

The uncertainty indication signalling may accompany the geographic location signalling to the apparatus of the first aspect. The respective signalling may be transmitted by the actual white-space device they are associated with or pertain to, or they may be transmitted by one or more other white-space devices. The signalling may also be transmitted by other further devices that are in communication (wired or wireless) with a given white-space device.

The uncertainty indication signalling indicates an uncertainty area associated with the determined/calculated geographic location of the white-space device. As with any measurement, there is some error or uncertainty associated with the accuracy of the measurement. This uncertainty represents the area around the determined/calculated location of the white-space device that, as a result of the error associated with the determination of the white-space device's geographic location, the white-space device may be located in. In some situations, the uncertainty in the geographical location measurement may be as a result of lack of sufficient data to perform a better location determination. By taking the actual uncertainty associated with the white-space device's location into account, it is possible to improve the identification of channels available for use by such white-space devices. For example, where accuracy of the geographic location measurement is higher than an assumed default accuracy/uncertainty, a smaller uncertainty area need be considered (when compared to when a default accuracy/uncertainty area is assumed) and more channels may be identified as available for use by a given white-space device.

The apparatus may be configured to use channel availability data to determine the one or more channels available for use by the respective one or more white-space devices, the channel availability data configured to indicate the one or more channels available for white-space communication within respective geographical sub-regions of a geographical region.

The apparatus has access to this channel availability data. This channel availability data links white-space channels available for use to a respective geographical sub-region in which they are available for use. This data may be stored in a database on a data storage medium or data carrier, such as computer hard drive or solid state memory. This data may also be stored in the form of an electrical signal, such as an online accessible database. This database may be updated frequently, constantly, occasionally, or never.

The apparatus may be configured to determine the one or more channels available for use in the particular determined geographical location by being configured to:
  determine the different respective sub-regions which are at least partially overlapped by the uncertainty area associated with the one or more determined white-space device locations; and
  identify the channels available for use by the one or more white-space devices based on the common channels available for use within the different respective sub-regions which are at least partially overlapped by the uncertainty area.

By determining which geographical sub-regions are at least partially overlapped by the uncertainty area it is possible to identify which channels are available for use within the geographic area/regions that the white-space device is intended to be used in. As soon as it is known which region a white-space device will be operating in, the database will automatically identify which white-space channels are associated with those regions.

These identified channels may then be allowably used by the white-space device. This overlapping may involve graphical representation of the respective areas/regions of the database and those represented/indicated by the signalling, or may involve calculating and comparing geographic global positioning system (GPS) co-ordinates against the database, or the like.

The apparatus may be configured to determine the one or more channels available for use for communication between two or more white-space devices by being configured to:
  determine the different respective sub-regions which are at least partially overlapped by the respective uncertainty areas associated with each of the determined white-space device locations; and
  identify the channels available for communication between the two or more white-space devices based on the common channels available for use within the different respective sub-regions which are at least partially overlapped by the uncertainty areas.

Where there are two white-space devices, they may wish to communicate with one another. By identifying common channels available between the two white-space devices, it is possible to determine which channels can be used by the respective devices to communicate with each other.

For a network of two or more white-space devices, the apparatus is configured to identify channels available for use between respective white-space devices in the network by being configured to
  determine the different respective sub-regions which are at least partially overlapped by both the respective uncertainty areas associated with each of the determined white-space device locations, and determine a defined geometric area over which the network intends to operate; and
  identify the channels available for communication between each of the respective white-space devices based on the common channels available for use within the respective uncertainty areas associated with each of the white-space devices, and the channels available for use within the defined geometric area.

The geometric area may be provided or associated with the geographic location signalling. The geometric area may be defined by receipt of signalling from respective white-space devices.

The apparatus may further be configured to identify the channels available for communication between each respective pair of white-space devices based on the common channels available for use within the respective uncertainty areas associated with each of the white-space devices in each respective pair, and the channels available for use within the defined geometric area.

Where there are two or more white-space devices, the white-space devices may be part of (or choose to form part of) a network (ad hoc, temporary, permanent, or otherwise). The total network may cover an area larger than the sum of the individual uncertainty areas of the respective white-space devices of the network. In order to ensure that each device can allowably communicate on common channels, it is useful to determine whether the geographical regions between the location and uncertainty areas of two such white-space devices allow for a common channel of communication between the two devices.

The apparatus may be configured to, when the apparatus identifies a pair of white-space devices in a network that have no common channels available for use for communication, identify an indirect communication path between the white-space devices of the pair using channels available for use between other white-space devices of the network and each of the white-space devices of the pair.

The white-space devices for which available channels are determined may be configured to store a portion of the channel availability database that pertains to their location. Any such portable white-space devices may be configured to switch to another available channel upon determining that a new location that they have moved to, or are moving to, renders/would render their current channel unsuitable/unavailable for use. The white-space devices may comprise a memory, or a cache for storing said portion of the database.

In the situation where two white-space devices in a network cannot allowably communicate directly along a common channel, it may be possible to communicate via an indirect path using other white-space devices in the network.

The geometric area indicated by the signalling may be in the form of a circle, or another polygon, such as a square, triangle, pentagon, hexagon or a polygon with any number of sides, regular or irregular.

In another aspect, there is provided a transceiver comprising the apparatus of the first aspect.

In another aspect, there is provided a network system comprising one or more white-space devices and the apparatus of the first aspect.

In yet another aspect, there is provided an apparatus comprising:
  means for receiving geographic location signalling associated with the particular determined geographical location of one or more white-space devices;

means for receiving uncertainty indication signalling for the uncertainty associated with the particular determined geographic location of the one or more white-space devices; and means for determining the one or more channels available for use by the respective one or more white-space devices in the particular determined geographical location by using the geographic location signalling and uncertainty indication signalling.

In a further aspect, there is provided a method for determining one or more channels available for use by respective one or more white-space devices, the method comprising:

receiving geographic location signalling associated with the particular determined geographical location of one or more white-space devices;

receiving uncertainty indication signalling for the uncertainty associated with the particular determined geographic location of the one or more white-space devices; and determining the one or more channels available for use by the respective one or more white-space devices in the particular determined geographical location by using the geographic location signalling and uncertainty indication signalling.

In still another aspect, there is provided a computer program product comprising a non-transitory computer-readable medium bearing computer program code embodied therein for use with a computer, the computer program code being configured to, when run, perform the method of the aspect immediately above.

In still another aspect, there is provided an apparatus that is configured to identify, for a network of two or more white-space devices, channels available for use between the respective white-space devices in the network by being configured to:

receive geographic location signalling associated with the particular determined geographical location of two or more of the white-space devices of the network;

receive uncertainty indication signalling for the uncertainty associated with the particular determined geographic location of said white-space devices;

determine a defined geometric area over which the network intends to operate;

identify the channels available for communication between the respective white-space devices in their respective determined geographical locations by using the geographic location signalling and uncertainty indication signalling, together with the channels available for use within the defined geometric area.

This apparatus may be configured to determine the defined geometric area over which the network intends to operate from the received location signalling associated with the white-space devices and/or the received uncertainty indication signalling associated with the geographic location of said white-space devices. This apparatus may also be configured to receive further area of operation indication signalling that indicates the defined geometric area over which the network intends to operate.

The apparatus may be further configured to receive area of operation indication signalling indicating the intended area of operation of the network, and determine the defined geometric area over which the network intends to operate using the area of operation indication signalling.

The apparatus may receive area of operation indication signalling that actually tells the apparatus what the geometric area of operation is. This may have been initially determined by any one or more of: one or more white-space devices in a network, a network comprising one or more white-space devices, or even one or more of a server, distributed database or communication node that are involved with communicating signalling to the apparatus.

The apparatus may be further configured to determine the defined geometric area over which the network intends to operate using the received geographic location signalling and uncertainty indication signalling.

In another aspect, there is provided an apparatus configured to:

receive geographic location signalling associated with the particular determined geographical location of one or more white-space devices in a network;

receive area of operation indication signalling indicating the intended area of operation of the network; and determine the defined geometric area over which the network intends to operate using the area of operation indication signalling.

The apparatus may be configured to:

identify, using a connected channel availability database, grid points contained in the determined area of operation (e.g. defined geometric area); and generate a response containing the grid points' coordinates and the associated channel availability information.

The grid points of the channel availability database may cross reference the grid point co-ordinates of geographical sub-regions of a dissected geographical area with white-space channels available for use within those respective sub-regions.

The response generated by the apparatus may provide one or more white-space devices with an indication, information, or an instruction as to which channels are available for use within which particular geographical sub-regions (which may be done via provision of corresponding grid point co-ordinates) by respective white-space devices.

Corresponding computer programs for implementing one or more of the methods disclosed are also within the present disclosure and encompassed by one or more of the described embodiments.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:—

FIG. 2 shows an illustration of the apparatus according to a first embodiment of the invention.

FIG. 3a shows an illustration of the location uncertainty used in an apparatus according to an embodiment of the invention.

FIG. 3b shows an illustration of the uncertainty area used in an apparatus according to an embodiment of the invention.

DESCRIPTION OF EXAMPLE ASPECTS/EMBODIMENTS

Figure 1:
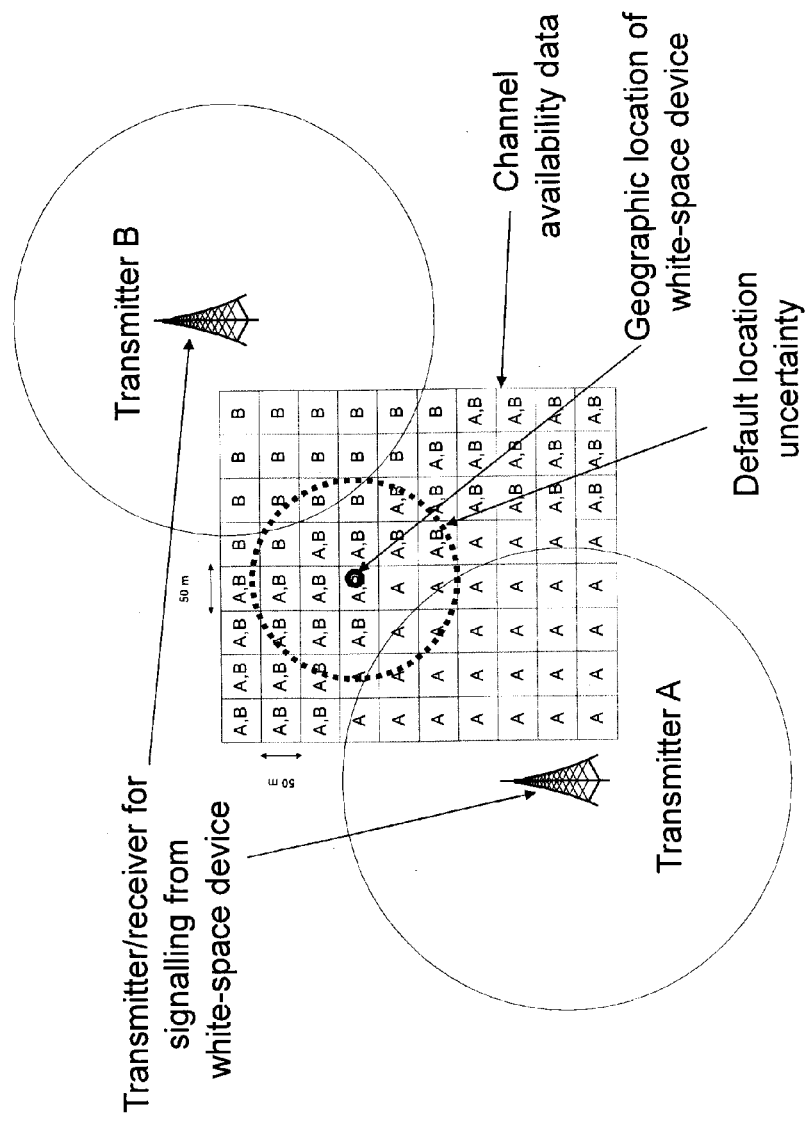
FIG. 1 shows an illustration of the operation of the prior art.

According to a first embodiment, there is described an apparatus configured to determine one or more channels available for use by respective one or more white-space devices in a particular determined geographical location. The apparatus is configured to receive geographic location signalling associated with the particular determined geographical location of one or more white-space devices. The apparatus is also configured to receive uncertainty indication signalling for the uncertainty associated with the particular determined geographic location of the one or more white-space devices. The apparatus is configured to determine the one or more channels available for use by the respective one or more white-space devices in the particular determined geographical location of the respective white-space devices by using the geographic location signalling and uncertainty indication signalling.

By providing for the reception of location uncertainty indication signalling and providing the actual uncertainty associated with the geographical location measurement of a particular white-space device, it is possible to determine a more realistic and accurate representation of where the white-space device may be geographically located. Consequently, this helps the apparatus to determine more meaningful and reliable result when queried as to what channels are available for use by a particular white-space device, as the actual area that the white-space device may be located in is used to identify these channels.

We will now describe such an apparatus 100 according to a first embodiment of the present invention with reference to FIG. 2.

FIG. 2 illustrates apparatus 100 which comprises an input 1, a processor 2, a memory 3, and an output 4.

The input 1 is a wireless receiver, at least in this embodiment, that is capable of receiving the incoming signalling associated with a white-space device. This wireless receiver can be a radio mast receiver or transceiver, or any other wireless receiver (such as an antenna or aerial) that is capable of receiving suitable electromagnetic radiation such as long and short radio waves, microwaves, or the like. In other embodiments, the input 1 is a physical electrical connection to a further receiver, or to a further system configured to receive and handle such white-space channel queries. A purpose of the input 1 is to receive signalling associated with white-space devices so as to provide this onward to the processor 2. The skilled person will appreciate that there are other options available that would be suitable for providing an appropriate input 1. For example, the communication interface between white-space devices and a relevant channel availability database could be, in some embodiments, over a hypertext transfer protocol (HTTP) link over the Internet.

The processor 2 is an Application Specific Integrated Circuit (ASIC) specifically configured to perform the task of processing incoming signalling from the input 1. In other embodiments, the processor is a general purpose CPU that is capable of performing the same tasks, or capable of performing further tasks as well. In other embodiments the processor 2 comprises a plurality of separate integrated circuits that are provided to perform said tasks. These integrated circuits may be provided locally and together, or separately or even remote from one another.

The processor 2 has a first input pin to allow the processor 2 to be electrically connected to input 1, a second output pin to allow the processor 2 to be electrically connected to output 4, and a third memory pin to allow the processor 2 to be electrically connected to memory 3.

The memory 3 is a computer readable medium that has a channel availability database stored thereon (such as those databases discussed previously). In this embodiment, the memory is readable/writeable solid state memory. In other embodiments, the memory may be read only memory (ROM), or may even be a physical hard drive.

The memory 3 is to be electrically connected to the processor 2 via the memory pin of the processor 2 to allow the processor 2 to access the channel availability data stored on the memory 3. The skilled person will appreciate that, as the memory is just providing the processor 2 with the data needed to determine channels available to particular white-space devices, there are other embodiments (not shown) in which the memory 3 providing the database may actually be distinct and separate from the apparatus 100, and may be just remotely accessed by the processor 2 of the apparatus.

In such embodiments, the memory may still be a solid state memory or hard drive, but the memory providing the database may also be in the form of an electrical signal such as an online stored database. The database may even be a collection of smaller databases that the processor is able to access via the memory pin. The skilled person will appreciate that other such variations are also within the scope of the invention.

The output 4 is a wireless transmitter for transmitting a response to a channel availability query, at least in this embodiment. In other embodiments it is a physical electrical connection to a further transmitter, or to a system that is set up to handle such channel availability queries (as mentioned briefly above). The output 4 is to be electrically connected to the processor 2 to allow for electrical communication between the two components. A purpose of the output 4 is to allow the processor 2 to communicate the channels it has determined as available onwards, e.g. to a transmitter and onto a white-space device, etc. The skilled person will appreciate that there are, therefore, other possible variations that the output 4 could be that are within the scope of the invention.

In another embodiment (not shown), the input and output 1, 4 are actually both part of the same transceiver that is configured to be able to receive signalling associated with white-space devices, and also to be able transmit a response to said signalling.

We will now describe the assembly/physical structure of this apparatus 100.

The input 1 is electrically connected to the input pin (not shown) of the processor 2, the output 4 is electrically connected to the output pin (not shown) of the processor 2, and the memory 3 is electrically connected to the memory access pin (not shown) of the processor 2. This is to allow the processor 2 to be in electrical communication with each of these elements.

In this embodiment, the apparatus is formed on a printed circuit board (PCB, but this may also be a printed wiring board—PWB). The processor 2 and memory 3 are actually soldered directly to the PCB, and the respective electrical connections between the pins of the processor 2 and the input 1, output 4, and memory 3 are also formed via soldering. In other embodiments the PCB provides a push-fit integrated circuit (IC) connector (not shown) for receiving the processor 2 and soldering lugs connected to this connector for allowing direct connection of the other components to the processor 2 (once push-fit into the IC connector). In other embodiments screw terminals may be used to connect the various components together.

In another embodiment, for example one where the memory 3 providing the database is actually separate from the apparatus 100, the processor 2 is actually formed within a module (for example, being formed within epoxy resin) and the pins of the processor 2 connected to external wire conductors that allow for connection to the other components (input 1, output 4 and memory 3).

The skilled person will appreciate that there are a number of other variations that may be used to assemble the described apparatus 100.

Figure 4:
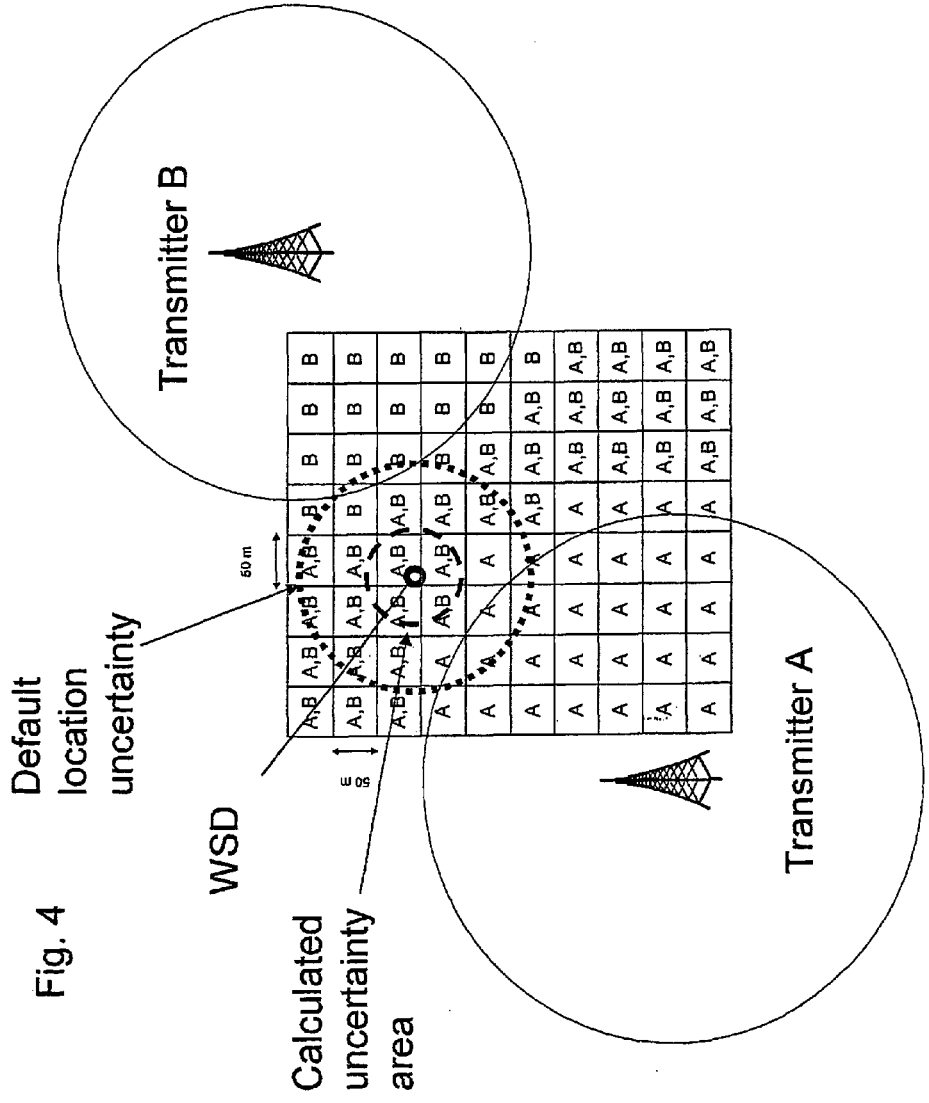
FIG. 4 shows an illustration of the operation of an embodiment of the present invention and in contrast with that of the prior art.

We will now describe the operation of this apparatus 100, and in particular the operation of the processor 2, with reference to FIGS. 2-4.

As is evident from the above description and FIG. 2, the input 1 will initially receive geographic location signalling and location uncertainty indication signalling. This is then received electrically by the processor 2. The processor 2 then accesses the channel availability database stored on the electrically connected memory 3 to use in processing the received signalling. The operation of the processor 2 is now described below.

FIG. 3a illustrates the information provided by the location uncertainty indication signalling. This signalling provides an indication as to what uncertainty (or accuracy/error) there is associated with the determined geographical location of the white-space device.

As mentioned above, there is almost always an error associated with the determined location of any device (white-space or otherwise). This error is dependent on a number of factors, but is ultimately dependent on the accuracy of the method used to establish its geographical location. Certain methods are known to bring with them a particular level of error or uncertainty. For example, GPS systems are capable of identifying the geographical location of connected devices to an accuracy on the order of ±1-10 m, at least when used outside with a clear signal. Also, in GPS, the achieved accuracy does not only depend on the signal clarity, but on the number of satellites the device connects with to establish geographic location.

Other methods, such as those that use Wi-Fi based geolocation can be accurate to the order of anywhere from ±1-100 m. Some methods can have widely varying accuracy depending on the nature the situation (for example, we have already mentioned that determination of location via Wi-Fi can vary from 1 m to 100 m depending on the circumstances). Therefore the white-space device may also take this aspect into account (discussed in detail below). In some situations, location may be determined via triangulation of the position of the device relative to other devices. Methods of triangulation could also be used to improve the accuracy of location determination (for example, by determining location using a number of methods).

In essence, the accuracy/uncertainty of determined location of a device varies from method to method, but generally an uncertainty associated with a method of determining geographical location is known in the art. The white-space device therefore provides this information regarding the actual uncertainty in geographical location reading with the reading itself (in the form of the location uncertainty indication signalling).

In the example illustrated in FIG. 3a, the location uncertainty indication signalling provides both an 'x' uncertainty component and a 'y' uncertainty component. This effectively transcribes an "uncertainty area" around the identified/measured geographical location of the white-space device. This "uncertainty area" is a term that we will use to refer to the area that the white-space device could conceivably be in, due to the inherent uncertainty/inaccuracy of the measured location. In other embodiments, the information may be provided in the form of a single accuracy reading/tolerance, e.g. ±10 m, that effectively prescribes a circular uncertainty area around the identified geographic location of the device. The uncertainty area can also be provided in the form of a polygon, for example, by providing the geographical coordinates of the edges of the polygon, or even the corners of the polygon (like the x,y co-ordinates that prescribe a rectangular uncertainty area as shown in FIG. 3a).

FIG. 3b shows a particular outworking and use of this uncertainty area in the present embodiment. By providing the actual location uncertainty associated with a particular white-space device measured geographical location, the actual uncertainty area in which the device may be located is determined. This can be contrasted with the prior art, in which a default uncertainty is assumed, thus resulting in an unreliable indication of the area in which the device may be located. This stark contrast is shown in FIG. 3b.

The prior art essentially operates on the assumption that the determined geographic position associated with a given white-space device is such that, provided the WSD location is in the centre of a given geographical sub-region, then the whole white-space device plus the assumed uncertainty area resides within a single geographical sub-region of the channel availability database. In practice, such assumptions may not reliably represent the accuracy of the geographical positioning. A given white-space device could potentially be located over a wider area than the assumed possible area. This embodiment seeks to present a way to alleviate this issue.

FIG. 4 illustrates how this is applied in the present embodiment. Here we have illustrated a simple example that is similar to the grid-like channel availability databases that we have already discussed. In this example, the channel availability database dissects a geographical area/region into a plurality of geographical sub-regions in the form of a grid. Each geographical sub-region is a simple square/rectangle shaped grid point (as discussed above). These grid points cross reference grid point co-ordinates of the geographic area/location they denote with corresponding white-space channels available within that area/location. The skilled person will appreciate that in other embodiments a channel availability database may represent a geographical area/region that has been subdivided or dissected into regular or irregular shaped grid points or sub-regions, such as triangles, circles, pentagons, other polygons, other regular and irregular shapes, and the like.

In this example, once the processor has received the geographic location signalling and the location uncertainty indication signalling, the processor 2 can establish the location and size of the uncertainty area as prescribed by the signalling. The processor 2 then effectively overlays this uncertainty area onto the channel and geographical sub-region data provided by the channel availability database stored on the memory 3. This results in a comparison effectively as illustrated in FIG. 4.

The processor 2 can identify that the possible location of the white-space device (being within the uncertainty area)

means that the white-space device can utilise bands A and/or B. Both these channels are available for use by this white-space device.

We have also shown, for contrast, what could happen if a default uncertainty assumption were made as per the prior art. In this case, an unreliable area is used to establish where the white-space device may be located, and as such there are no channels identified as suitable and available for use by the processor (as per the illustration of FIG. 1). In the prior art, the assumed uncertainty could result in a discrepancy that means a channel is indicated as available to a device, when in reality that channel is in use in the vicinity of the white-space device.

The processor 2 therefore uses the determined uncertainty area and geographic location of the white-space device to reliably determine channels available for use by the querying white-space device in a particular geographical sub-region.

The present embodiment therefore attempts to alleviate a key issue present in the prior art. By assuming a default error or uncertainty in a reading (as in the prior art), it is unlikely that the database will return a reliable or meaningful result. The actual accuracy associated with a determined geographic location may be better than an assumed default uncertainty. In this case, the actual area that the device may be located in is smaller than the area that is assumed based on the default uncertainty.

In another example, the actual uncertainty associated with the determined geographical location of a white-space device could be worse than the assumed default uncertainty. In this case, there is the unknown possibility that the device is actually outside the area assumed as the default uncertainty area of the location of the white-space device. As a result, the database could tell the device it could operate on one band, when in fact its genuine location should result in an indication that this channel is not suitable for use. By providing the actual location uncertainty associated with the determined geographic location of the white-space device, it is possible to provide some relief to these issues.

Returning to the manner in which the apparatus 100 operates, once the processor 2 has determined these channels, the processor 2 provides output signalling to the output 4. The output 4 then provides this information onwards via wireless transmission (at least in this embodiment) to the white-space device that sent the signalling as a channel availability query. In other embodiments the output 4 may provide this information to a connected channel availability query system, or a further transmitter, or the like.

Therefore, it can be seen there is provided an increased resolution in identifying channels available for use by particular white-space devices.

As mentioned above, the processor 2 is an ASIC, at least in this embodiment. This means that the processor 2 is physically and electronically configured to perform the described tasks, i.e. it is a piece of hardware (HW) configured in the necessary way. The skilled person will appreciate that the operation of the processor 2 may also be implemented via software (SW). For example, in embodiments where the processor 2 is a general purpose CPU, the memory may comprise computer code that instructs the perform to perform the abovedescribed processing tasks. This allows the apparatus 100 to be implemented, in other embodiments, on a computer system utilising a CPU, memory, an input and an output to process the received signalling. The skilled person will appreciate that other variations (such as a combination of HW and SW implementation) may be used and that still other variations are within the scope of the invention.

In some embodiments, the apparatus 100 actually instructs the respective white-space devices to operate on one or more particular white-space operating channels. In other embodiments, the apparatus 100 gives the white-space devices a choice or indication as to which channels they may use. In other embodiments, the apparatus 100 may enter into dialogue with the white-space device. In still other embodiments, the apparatus 100 may provide a relevant portion of the database stored on the memory 3 to the white-space device such that the device can make further decisions on which channel to use some time after the initial query without having to make a channel availability query again or await a response on such a query.

Whilst this embodiment is directed towards the apparatus 100 on the receiving end, i.e. the apparatus 100 receives the information from white-space devices, this invention may be implemented as a total system. For example, the white-space devices determine their own location and error associated with that reading, and provide both these components to the apparatus 100 to obtain information regarding channels available for use. This presents a system that has both a transmitting device end, and a receiving/transmitting apparatus end. Both ends are within the scope of the present application.

It should be noted that although the first embodiment of the present invention has been extensively described with reference to current FCC rulings, the scope of this invention is not limited or solely restricted to operation under FCC rulings. The skilled person will appreciate that this invention and the various embodiments described herein may be adapted to be suitable for use in other regions and other related purposes.

The first embodiment described above, and other embodiments described herein, may utilise one or more already known channel availability databases, but they may also utilise their own custom databases that are optimised for use with the described apparatus. The apparatus 100 may also be configured to alter the information it receives from the database to be more suitable for data processing to determine available channels, but may also write over existing data in the database based on information received from white-space devices or decisions made based on such information. The apparatus 100 may also create its own customised/optimised database of channel availability data via accessing other known databases. This may, again, be stored on the memory 3 or be stored elsewhere (see discussion of alternative memory 3 options above).

Figure 5:
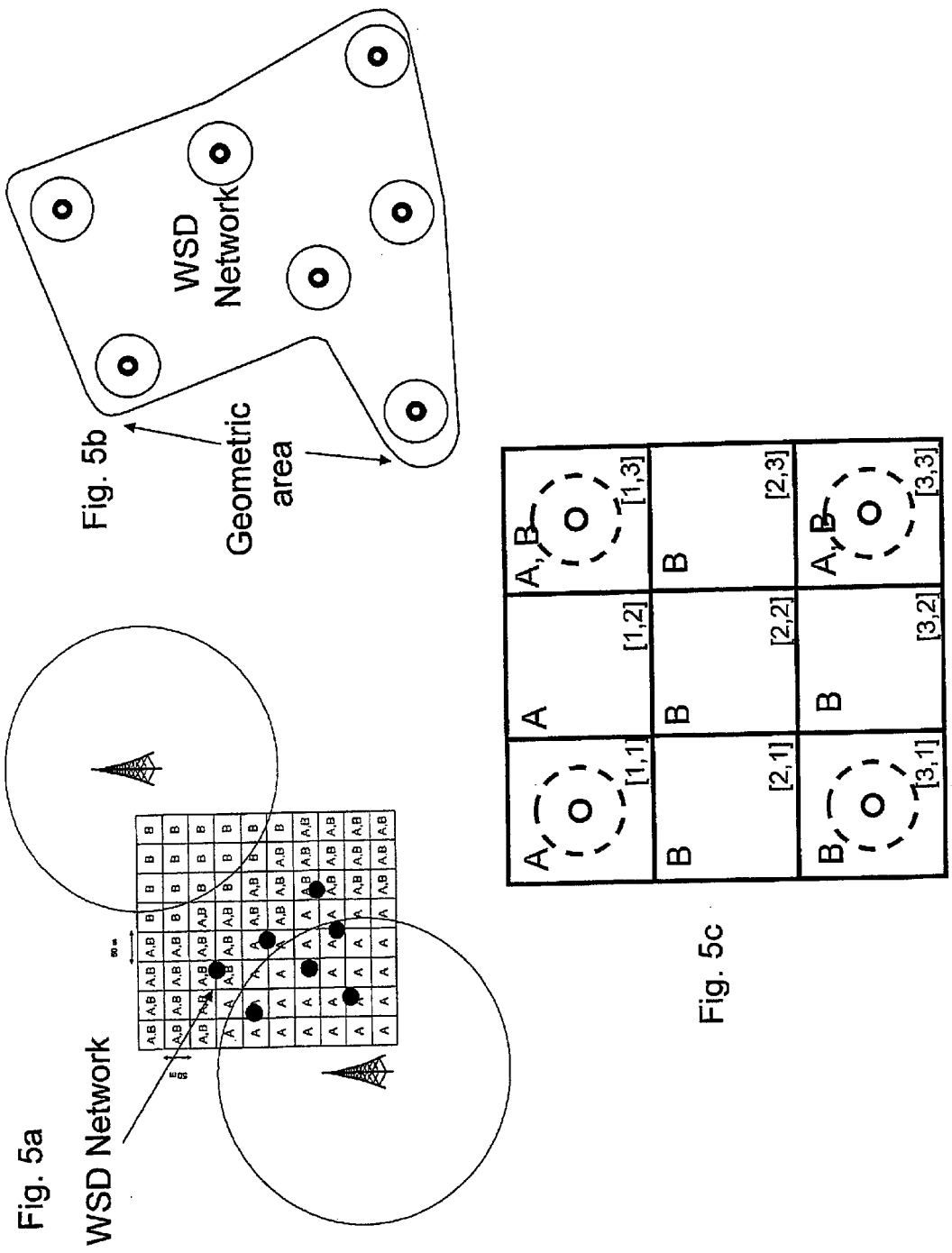
FIG. 5a shows the operation of a further embodiment of the present invention.
FIG. 5b shows the operation of yet another embodiment of the present invention.
FIG. 5c shows the operation of yet another embodiment of the present invention.

We will now describe a variation of the operation of the first embodiment with reference to FIGS. 5a-5c.

In some scenarios there may be a plurality of white-space devices that wish to communicate with one another within a particular area, and they may need to establish a common channel usable for communication between them. For example, a plurality of white-space devices may be part of a network (be it ad hoc, temporary, permanent, or the like) or they may be independent devices whose users merely wish to communicate between devices. In a further variation on the first embodiment, the processor 2 is also configured to handle such situations.

FIG. 5a shows an illustration of such a scenario, where there are seven different white-space devices spread across a relatively large geographic area (in comparison to the size of portable white-space devices, e.g. mobile phones, personal music players, etc). To allow for communication between at least two (or any two) of these devices it is necessary to establish some common channel of communication between the respective devices.

In essence, the processor 2 is configured to receive the relevant location and uncertainty signalling from the white-space devices that wish to communicate with one another (via the input 1 as per the first embodiment). The processor 2 operates in substantially the same way as the first embodiment, but is additionally configured to compare the channels identified as available for each respective white-space device and to compare these to determine at least one common channel to allow for communication between the devices.

For example, FIG. 5c illustrates an example where there are four white-space devices that are each located (for simplicity) in separate geographic sub-regions. Each sub-region has been notated according to its [row number, column number] in the bottom right corner of each sub-region for clarity. We will also refer to each white-space device by the sub-region it is located within. Each sub-region has its corresponding available channels notated in the top left corner (e.g. A, B)—(we have only referred to channels A & B for simplicity; the skilled person will appreciate that this scenario could be expanded to include one or more different white-space channels).

In this scenario, white-space device [1,1] wishes to communicate with white-space device [1,3]. In order to do this, both devices must establish whether there is a common communication channel available to both devices, and be able to operate on this common channel. As has been explained above, upon receiving the relevant signalling from the two white-space devices, the processor 2 will determine that [1,1] and [1,3] both have channel 'A' available after consulting the channel availability database. The processor 2 will then, in turn, provide an output to the output 4 that indicates that the white-space devices [1,1] and [1,3] can communicate with each other on communication channel A.

In another situation, there may be a plurality of devices that each wish to communicate with one another. For example, the devices may wish to communicate as a network of devices. We will now refer again to FIG. 5c. In this illustration, there may be four white-space devices that wish to communicate with one another, i.e. there are 3! (factorial, i.e. (n−1)!, where n is the number of white-space devices) different respective pairs of white-space devices that wish to communicate with each other.

These networks can sometimes occupy a larger physical space/area than the sum of their respective uncertainty areas. In such scenarios, it is necessary to establish common channels of communication open to each of the pairs. A problem thrown up by this complex inter-communication between the devices is when the area of intended operation of the network does not have any channels identified as available for communication across the whole network. For example, there may be geographical sub-regions between certain devices that prevent white-space transmission along any of the channels that are just common between the two devices. This is an issue that does not appear to be addressed in the prior art.

A remedy to this problem is suggested in another variation of the first embodiment. The principle behind this is illustrated in FIG. 5b.

FIG. 5b shows (a sample group of) 7 white-space devices. As a network of devices that intend to communicate with one another, the network as a whole can be seen to occupy a larger space/area than the sum of the devices individual uncertainty areas. This area occupied by the network can be considered to be the area of intended operation of the network. It is an area of interest to the apparatus, as the apparatus will need to consider this area when assessing/identifying channels available for use by the respective devices. The network therefore defines this intended area of operation as a particular geometric area having a particular size and shape.

By providing this information regarding the geometric area of intended operation to the apparatus, it is possible to include and consider the channel availability for the whole geometric area (as well as the channel availability for each white-space device as indicated by their respective uncertainty areas) and as prescribed by the intermediate geographic sub-regions (i.e. sub-regions positioned between various respective white-space devices in the network). It should be noted that this information regarding the geometric area of intended/possible operation can be determined and provided by the network or devices in the network, but in other embodiments the geometric area can be determined by the apparatus 100 once it identifies the location and uncertainty areas associated with each of the devices in the network. Similarly, there may be one or more intermediate components that allow for communication between the devices of the network and the apparatus 100 that performs the processing. It will be appreciated by the skilled person that any of these intermediate components (such as servers, communication nodes, distributed databases, further transmitters/receivers, and the like) may allow for or perform determination of the intended geometric area of operation of the network of white-space devices.

In this embodiment, the geographic location signalling received by the apparatus 100 also provides an indication as to size and shape of the geometric area associated with the network. In other embodiments this information may be provided via area of operation indication signalling that indicates the geometric area of intended operation of the network. In other embodiments, the apparatus 100 is configured to identify the geometric area/intended area of operation of the network from the received geographic location signalling and/or location uncertainty indication signalling.

The processor 2 of the apparatus 100 is configured to identify the geometric area from received signalling (in this embodiment) and to include this indication in its calculations.

For example, in the illustration of FIG. 5b, the network of devices forms an irregular polygon shape. The corners of the polygon may be communicated via the geographic location signalling (again using GML markup language) to indicate the geometric area over which the network operates or is intending to operate. Another option that is used in other embodiments is to identify the smallest circle within which the network fits, and transmit (within the signalling) just the radius of the circle to identify the geometric area within which the network is located. The network may obviously take many different shapes, and therefore different geometric areas may be indicated/communicated to the apparatus 100 for use in determining appropriate and available channels for white-space communication.

This information may be provided by all the linked devices independently, or the information may be provided by a host device that is controlling the (ad-hoc type, such as a network that is set up temporarily or that is impromptu between a collection of portable devices) network (such as a server or host computer/device acting as an access-point or mobile base station).

For example, a host device or device acting as an "access-point" may treat itself as the centre of the network and indicate that the geometric area of the network is actually prescribed a circular area, the radius of the circle being prescribed by the distance between the host device and the most distant white-space device within the network.

In some situations where such white-space device networks exist (either temporary or permanent networks, or a combination or the two) certain devices (portable and permanent) can act as access-points or mobile base stations. These act like a "nexus" for the network, i.e. a common point of connection that participant "slave" devices of the network can communicate through. It should be noted that in some situations, this "access-point" is always defined as one particular device, but that in some situations it is dynamic and can shift between devices. In these situations, the devices that are capable of switching their mode of operation can be considered to be "soft access-points". The responsibility of the "access-point" or host device may also be shared out between other devices of the network. This will be explained in more detail with reference to specific scenarios.

Other possible variations are within the scope of the invention and will be appreciated by the skilled person.

We will now describe a working through of this embodiment with reference to FIG. 5c and with reference to specific scenarios.

The network illustrated in FIG. 5c consists of four white-space devices. These each have an uncertainty area associated with them. The network itself also has a geometric area in which it intends to operate that is associated with the network. This effectively translates as a square in this scenario that is the outline of FIG. 5c.

Once receiving the geographical location signalling (carrying geographic location of each respective device and also carrying an indication of the geometric area occupied by the network) and the uncertainty signalling, the apparatus 100 will identify suitable channels available for use by the devices of the network via a two step test. The test involves considering the combination of:

1) Identification of common channels between each of the respective pairs of WSDs in the network based on the channels indicated as available by the geographical sub-regions of the channel availability database that are overlapped (at least partially) by the uncertainty areas of each of the white-space devices in the pair; and 2) Identification of the channels available within the geometric area in which the network wishes to operate. This is also done by overlapping the geometric area over the geographical sub-regions of the channel availability database to identify channels available across that area. This geometric area helps the apparatus to identify other sub-regions not overlapped by the uncertainty areas that should also be considered when determining available communication channels.

This two step test is important to avoid conflicting with current FCC rulings on unlicensed white-space devices. This can be illustrated with several scenarios and referring to FIG. 5c.

First scenario: WSD [1,1] wishes to communicate with [1,3]

The first step would identify the common channels between the WSDs based on their uncertainty areas. This would identify channel 'A' as being the only common channel. The geometric area would indicate which sub-regions also need to be considered by the apparatus. In this case, the geometric also indicates that sub-region [1,2] needs to be considered. This sub-region [1,2] allows white-space transmission over channel 'A' and therefore WSDs [1,1] and [1,3] are allowed to communicate directly over this band.

It is not necessary to have one common channel over the whole geometric area, as in some situations (such as FIG. 5c), this may not be the case. Instead, the geometric area is used to ensure that all relevant sub-regions are considered when determining channels available for use with direct communication between two or more white-space devices.

Second scenario: WSD [1,1] wishes to communicate directly with [3,3]

As per the operation discussed in the first scenario, if [1,1] wishes to communicate directly with [3,3], it would need to do so on a channel common to both, i.e. channel 'A'. However, the geometric area indicates that sub-region [2,2] must also be considered when assessing direct communication between the two WSDs. This sub-region is located directly between these two devices and only permits white-space operation/communication on channel 'B'. As such, there is no channel available for direct white-space communication between [1,1] and [3,3], and therefore white-space transmission between these two devices is not permitted. The processor 2 must identify and report that there is no allowable channel for direct communication between [1,1] and [3,3]. This is important to ensure that white-space protocol is not breached, however this presents a problem in that no alternative way for [1,1] to communicate with [3,3] has been identified.

In a further variation, a possible solution to this is proposed.

Second scenario (continued): WSD [1,1] wishes to communicate indirectly with [3,3]

FIG. 5c shows that there is no common direct communication path between [1,1] and [3,3]. However, the processor 2 has already identified available communication channels between other respective pairs of the network. Therefore, there may be an indirect communication path from [1,1] and [3,3]. It can be seen that there is a direct communication path from [1,1] to [1,3], and also a direct communication path from [1,3] to [3,3]. This can be seen to provide an indirect communication path between [1,1] and [3,3] via [1,3]. The processor 2 in this embodiment is configured to all possible communication paths between all devices of a network, and then to subsequently identify whether there exists any indirect communication paths between respective white-space devices of a network. This helps to allow device pairs that lack a direct common channel of communication along which they can communicate with each other to identify an indirect channel of communication.

In some embodiments, the processor 2 is configured to identify an indirect communication path between two white-space devices even if there is a direct path between the two devices, whilst in other embodiments the processor 2 is configured not to identify an indirect communication path if a direct communication path has already been identified.

In this second scenario, the WSD [1,3] could be considered to be a relay device for WSDs [1,1] and [3,3]. This would involve receiving any communications from one of the devices that were intended for the other device, and then forwarding those communications on to the relevant device. It would be necessary for each communication to be "addressed" specifically to a particular device so that it the intended destination is reached.

As discussed above with reference to "soft access-points", the responsibility of an "access point" can be shared out between certain devices within a network. In this second scenario, WSD [1,1], [1,3] and [3,3] could be considered to form a kind of "sub-network" within the network, where there are two distinct branches of communication between [1,1] and [1,3], and [3,3] and [1,3]. In such a situation, [1,3] could be able to change modes to act as a "soft access-point" for these respective devices. This is like a virtual access point creating a virtual network for [1,1] and [1,3] to enable them to communicate. This change of mode on behalf of [1,3] may require a different processing of received signals to its normal "participant/slave" mode when in the network.

This way of permitting indirect communication between two white-space devices can be considered to be a "multi-hop" manner of communication, where signals are sent from an initial WSD, are transmitted via a series of intermediate white-space devices, to arrive at a destination WSD. Each intermediate stage can be considered to be a "single-hop", wherein all "hops" in combination yield an indirect "multi-hop" communication path.

We will now describe a particular technical implementation of a further embodiment of the invention. This operates in substantially the same way as the apparatus of the first embodiment. We will now illustrate a sample signalling that is received by the apparatus to provide the described geographical location signalling and location uncertainty indication signalling with reference to table 1.

Table 1 below illustrates the various respective portions of the sample signalling. The portions that are not highlighted in bold belong to the currently proposed/accepted protocol for managing white-space device channel availability. The other portions that are in bold are the additional portions that are to be added to this currently proposed/accepted protocol to allow for implementation of the abovedescribed embodiments.

Certain portions such as 'wsd FCCID' are mandatory (at least in the US due to FCC rulings) that provides the FCC ID of the unlicensed white-space device. Such mandatory portions must be included in channel availability queries transmitted by white-space devices. Other portions are conditional based on the user identity or actual use of the particular white-space device (e.g. such as user name, user phone number etc). The elements/portions identified in bold are the portions contributed by the abovedescribed signalling types.

| Element Name | Type | Condition | Description |
| --- | --- | --- | --- |
| wsdFCCID | String | Mandatory | FCC ID of device |
| wsdSerial | String | Mandatory | Manufacturers Serial Number of the device |
| wsdLoc | GML Point | Mandatory | Location of WSD |
| wsdUnc | Integer | Conditional | Uncertainty of WSD location |
| wsdPolygonP | GML Points | Conditional | Uncertainty of WSD location |
| wsdAreaOp | Integer | Optional | Location of possible operation |
| wsdAreaOpPol | GML Points | Optional | WSD area of operation |
| wsdOwner | String | Conditional | Name of person or business who owns the device |
| wsdContact | String | Conditional | Name of contact person responsible for the device |
| wsdAddress | String | Conditional | Address of contact person |
| wsdPhone | String | Conditional | Phone number of contact person |
| wsdEMail | String | Conditional | Email Address of contact person |
| wsdMode | Enumeration | Mandatory | Mode querier is operating in. Legal values are "Mode1", "Mode2" and "Fixed" |
| wsdAntennaHeight | Integer | Mandatory | Height of antenna, in meters above average mean sea level |

'wsdUnc' provides the uncertainty of the white-space device location to accompany the mandatory location of the white-space location. This could be a structured data describing the shape type and the parameters required to describe the shape, or data that describes the edges and/or corners of a polygon shape that indicates the polygon uncertainty area associated with each respective device.

'wsdPolygonP' provides, as described above, the uncertainty area in a form of a polygon associated with the uncertainty in the location of a particular device.

'wsdAreaOp' describes the area of intended/possible operation of the device or network. As discussed above, a network may span a large geographic area that is best described as a geometric shape or area. This portion of the protocol/signalling provides an indication of the location of this geometric area of intended operation of the network (or group of devices). This portion can be used to provide signalling that specifies the actual geometric area of intended operation to the apparatus 100. Another option is that this portion of the protocol can provide an indication of the location of one white-space device in the network, and the apparatus 100 uses such signalling from a number of white-space devices in a network to determine/calculate the area of intended operation of the network.

This signalling portion can also be used to indicate the possible location of the area of operation of the network. For example, if the white-space device or network is portable, and therefore likely to move, this possible movement must be taken into account by the apparatus to ensure that meaningful results are gleaned from the database. This would help the apparatus 100 to determine a channel suitable for use by a device even taking into account possibly movement of the device into different geographical sub-regions.

This protocol portion is an optional portion. Such portions may not be provided depending on the situation and nature of a particular channel availability query.

'wsdAreaOpPol' further contributes to this area of intended/possible operation by providing an indication of the actual geometric area that the device or network is likely to be operating in the form of a polygon. This has been discussed above in relation to the various embodiments.

Again, this is useful for the apparatus to ascertain channels that will remain available within the area occupied by the network, or throughout movement of the device, or to simply provide relevant information to the device to ensure it knows that it may need to adjust operating channels/frequencies based on its movement. For example, if the device's possible location and area of operation indicates that the device may crosses over from a sub-region that uses channel 'A & B' into a sub-region that uses channel 'B', the apparatus could inform the device to only use channel 'B' to avoid a conflict, or the apparatus could inform the device of this potential conflict such that the device would be aware of the potential conflict and adjust itself accordingly.

As discussed above, it is helpful to identify a possible device/network location and associated area of a network in the event that the network is movable/portable. If a device is movable or portable, then it may pass from one sub-region into another, which may require a further channel availability query. Providing information about probable locations and an associated area of operation can help to alleviate this issue in the manner discussed above.

It should be noted that in all of the above embodiments the apparatus has been configured to establish available channels of communication for one or more white-space devices. The skilled person will appreciate that this may involve sending instructions to respective white-space devices to connect on a particular white-space channel, as well as disconnecting from a particular white-space channel or releasing a particular channel form use by a white-space device. For example, when the apparatus detects that a device has moved into a region/sub-region that it must change channel for, or within which there are no available channels for use, then the apparatus can instruct a given white-space device to change or even disconnect a communication channel. In another example, the apparatus may identify that a second white-space device may wish to use a channel that a first idle white-space device is occupying. The apparatus may be configured to instruct the device to disconnect/release that channel so as to free the channel up for further use by another device, or the like.

It should also be noted that, with regards to certain portions of the protocol/signalling (such as wsdAreaOp), whilst the abovedescribed embodiments discuss that the devices of the network or the network itself may determine/calculate its intended area of operation, any component involved in communicating the signalling to the apparatus may actually determine the area of operation of the device/network. For example, if all devices in a network provide their location and uncertainty area to an apparatus 100, the apparatus could then calculate the intended or possible area of operation of the network, i.e. the geometric area occupied by the network. Similarly, any component within the infrastructure used to allow communication between the devices and the apparatus may allow for or perform the calculation/determination of the geometric area (such as serves, communication nodes, distributed databases, or the like).

In essence, various embodiments of this apparatus can be seen to provide a complete white-space channel availability management system for one or more white-space devices.

Figure 6:
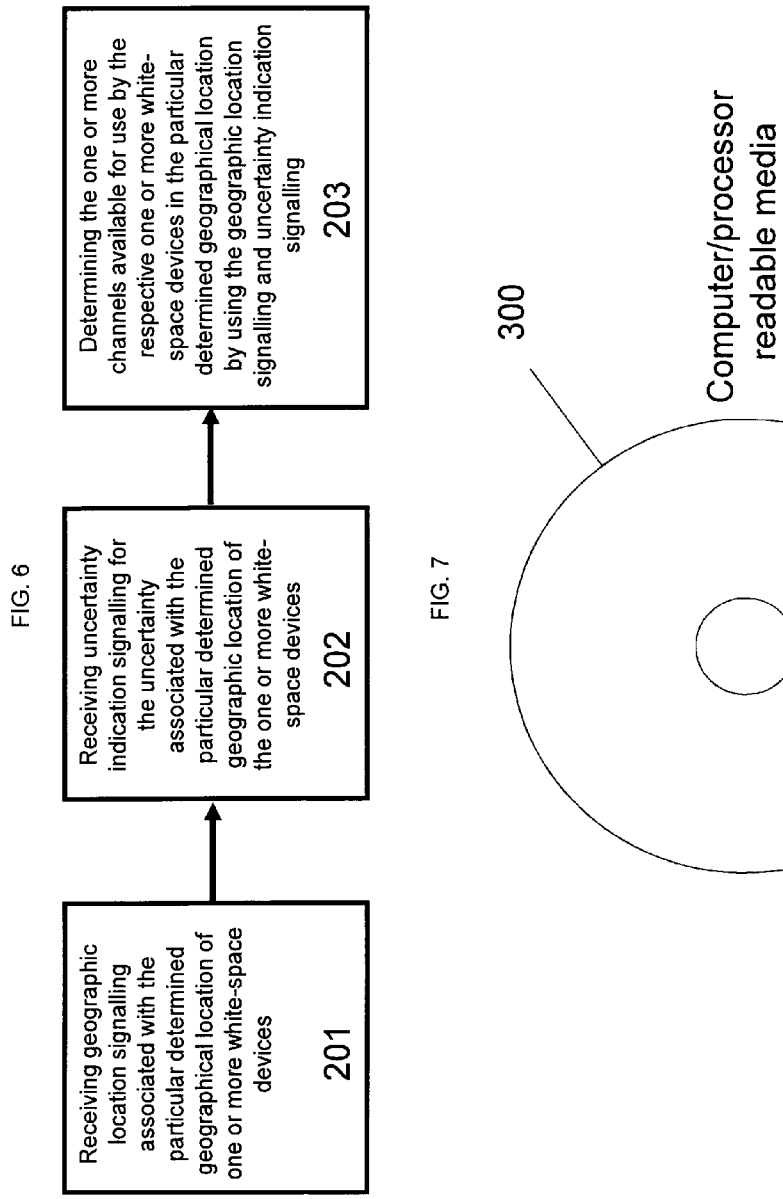
FIG. 6 shows a method of operation according to an embodiment of the invention.

In another embodiment, there is provided a method for determining one or more channels available for use by one or more respective white-space devices. This method is illustrated in FIG. 6. The method comprises:

201 receiving geographic location signalling associated with the particular determined geographical location of one or more white-space devices—as discussed above, the apparatus receives said signalling. This could be directly from the white-space device, or it may be via another route (e.g. a further white-space device, or white-space device network, or the like).

202 receiving uncertainty indication signalling for the uncertainty associated with the particular determined geographic location of the one or more white-space devices—as above, the apparatus receives the uncertainty signalling. From this it can be determined what the uncertainty area associated with the determined geographic location of the white-space device (as indicated by the received geographic location signalling) is for a particular white-space device or network; and 203 determining the one or more channels available for use by the respective one or more white-space devices in the particular determined geographical location by using the geographic location signalling and uncertainty indication signalling—the relevant location and uncertainty information provided by the received signalling is then used (as per the discussion of the various embodiments above) to identify and determine whether there are actually channels available for use by the white-space devices in their respective locations, and to identify what channels can be used by these devices.

Figure 7:
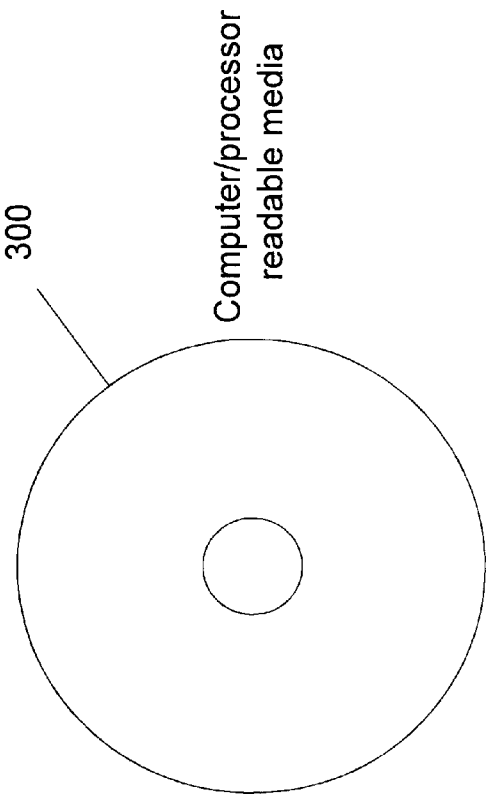
FIG. 7 shows a schematic illustration of a computer readable media providing a program according to an embodiment of the present invention.

FIG. 7 illustrates schematically a computer/processor readable media 300 providing a program according to an embodiment of the present invention. In this example, the computer/processor readable media is a disc such as a digital versatile disc (DVD) or a compact disc (CD). In other embodiments, the computer readable media may be any media that has been programmed in such a way as to carry out an inventive function.

It will be appreciated to the skilled reader that any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising a processor and memory, the memory including computer program code, wherein the memory and computer program code are configured to, with the processor, cause the apparatus to:

receive geographic location signaling associated with particular determined geographical locations of two or more white-space devices of a network;

receive uncertainty indication signaling for respective uncertainties associated with the particular determined geographic locations of the two or more white-space devices, the uncertainty indication signalling indicative of respective uncertainty areas within which the two or more white-space devices may be respectively located according to errors associated with the way in which the particular determined geographical locations of the two or more white-space devices are determined; and determine the one or more channels available for use in communication by the respective two or more white-space devices in their particular determined geographical locations by using the geographic location signaling and uncertainty indication signaling and channel availability data configured to indicate one or more channels available for communication within respective geographical sub-regions of a geographical region, wherein the apparatus is configured to determine the available channels by being configured to:

determine the different respective geographical sub-regions which are at least partially overlapped by the respective uncertainty areas associated with each of the determined white-space device locations;

determine a defined geometric area over which the network intends to operate, and identify one or more channels available for communication between each of the respective white-space devices based on common channels available for use within the respective uncertainty areas associated with each of the white-space devices and the channels available for use within the defined geometric area; and wherein the apparatus is configured to, when the apparatus identifies a pair of white-space devices in the network that have no common channels available for use for communication, identify an indirect communication path between the pair of white-space devices using channels available for use between other white-space devices of the network and each of the white-space devices of the pair.

2. A transceiver comprising the apparatus of claim 1.

3. A network system comprising one or more white-space devices and the apparatus as claimed in claim 1.

4. The apparatus as claimed in claim 1, wherein the apparatus is further configured to:

receive area of operation indication signaling indicating the intended area of operation of the network; and determine the defined geometric area over which the network intends to operate using the area of operation indication signaling.

5. The apparatus as claimed in claim 1, wherein the apparatus is configured to:

identify, using a connected channel availability database, grid points contained in the determined area of operation; and generate a response containing the grid points' coordinates and associated channel availability information.

6. A method, the method comprising:

receiving geographic location signaling associated with a particular determined geographical location of two or more white-space devices of a network;

receiving uncertainty indication signaling for respective uncertainties associated with the particular determined geographic locations of the two or more white-space devices, the uncertainty indication signalling indicative of respective uncertainty areas within which the two or more white-space devices may be respectively located according to errors associated with the way in which the particular determined geographical locations of the two or more white-space devices are determined;

receiving channel availability data, the channel availability data configured to indicate one or more channels available for communication within respective geographical sub-regions of a geographical region;

determining the one or more channels available for use in communication by the respective two or more white-space devices in their particular determined geographical locations by:

determining the different respective geographical sub-regions which are at least partially overlapped by the uncertainty areas associated with each of the determined white-space device locations;

determining a defined geometric area over which the network intends to operate, and identifying one or more channels available for communication between each of the respective white-space devices based on common channels available for use within the respective uncertainty areas associated with each of the white-space devices and the channels available for use within the defined geometric area; and when a pair of white-space devices in the network that have no common channels available for use for communication is identified, identifying an indirect communication path between the pair of white-space devices using channels available for use between other white-space devices of the network and each of the white-space devices of the pair.

7. A computer program product comprising a non-transitory computer-readable medium bearing computer program code embodied therein for use with a computer, the computer program code being configured to, when run, perform the method of claim 6.

* * * * *